(12) United States Patent
Choi (10) Patent No.: US 7,740,065 B2
(45) Date of Patent: Jun. 22, 2010

(54) PROCESS TO UPGRADE WHOLE CRUDE OIL BY HOT PRESSURIZED WATER AND RECOVERY FLUID

(75) Inventor: Ki-Hyouk Choi, Dhahran (SA)

(73) Assignee: Saudi Arabian Oil Company (SA)

( * ) Notice: Subject to any disclaimer, the term of this patent is extended or adjusted under 35 U.S.C. 154(b) by 0 days.

(21) Appl. No.: 12/277,275

(22) Filed: Nov. 24, 2008

(65) Prior Publication Data

US 2009/0139715 A1 Jun. 4, 2009

Related U.S. Application Data

(60) Provisional application No. 60/990,662, filed on Nov. 28, 2007, provisional application No. 60/990,648, filed on Nov. 28, 2007, provisional application No. 60/990,658, filed on Nov. 28, 2007, provisional application No. 60/990,670, filed on Nov. 28, 2007, provisional application No. 60/990,641, filed on Nov. 28, 2007.

(51) Int. Cl.
*E21B 43/40* (2006.01)
*E21B 43/22* (2006.01)
*E21B 43/24* (2006.01)

(52) U.S. Cl. .................... 166/267; 166/272.3; 166/275; 166/309; 166/372

(58) Field of Classification Search .................. None
See application file for complete search history.

(56) References Cited

U.S. PATENT DOCUMENTS

| 2,623,596 | A | 12/1952 | Whorton et al. |
| 3,989,618 | A | 11/1976 | McCollum et al. |
| 4,448,251 | A | 5/1984 | Stine |
| 4,483,761 | A | 11/1984 | Paspek, Jr. |
| 4,529,037 | A | 7/1985 | Froning et al. |
| 4,543,177 | A | 9/1985 | Murthy et al. |
| 4,733,724 | A | 3/1988 | Cardenas |
| 4,753,666 | A | 6/1988 | Pastor et al. |
| 4,818,370 | A | 4/1989 | Gregoli et al. |
| 4,840,725 | A | 6/1989 | Paspek |
| 5,096,567 | A | 3/1992 | Paspek, Jr. et al. |
| 5,316,659 | A | 5/1994 | Brons et al. |

(Continued)

FOREIGN PATENT DOCUMENTS

EP    1616931 A    1/2006

(Continued)

OTHER PUBLICATIONS

Adschiri et al. "Hydrogenation through Partial Oxidation of Hydrocarbon in Supercritical Water", published on Int. J. of The Soc. of Mat. Eng. for Resources, vol. 7, No. 2, pp. 273-281, (1999).

(Continued)

*Primary Examiner*—Zakiya W. Bates
(74) *Attorney, Agent, or Firm*—Bracewell & Giuliani LLP (57) ABSTRACT

A process for upgrading whole crude oil utilizing a recovery fluid, depressurizing an extracted whole crude oil/recovery fluid mixture in a step-wise fashion, and subsequently contacting at least a portion of the whole crude oil with supercritical water fluid to produce high value crude oil having low sulfur, low nitrogen, and low metallic impurities for use as hydrocarbon feedstock.

20 Claims, 4 Drawing Sheets

U.S. PATENT DOCUMENTS

| | | |
|---|---|---|
| 5,466,365 A | 11/1995 | Savastano et al. |
| 5,725,054 A | 3/1998 | Shayegi et al. |
| 5,778,977 A | 7/1998 | Bowzer et al. |
| 5,914,031 A | 6/1999 | Sentagnes et al. |
| 6,325,921 B1 | 12/2001 | Andersen |
| 6,328,104 B1 | 12/2001 | Graue |
| 2002/0046838 A1* | 4/2002 | Karanikas et al. ........... 166/257 |
| 2003/0168381 A1 | 9/2003 | Hokari et al. |
| 2006/0011511 A1 | 1/2006 | Hokari et al. |
| 2006/0042999 A1 | 3/2006 | Iqbal et al. |
| 2006/0231455 A1 | 10/2006 | Olsvik et al. |
| 2008/0066918 A1 | 3/2008 | Smith |

FOREIGN PATENT DOCUMENTS

| | | |
|---|---|---|
| EP | 1826527 A | 8/2007 |
| JP | 2000-104311 | 9/1998 |
| JP | 2000-109850 | 10/1998 |
| JP | 2001-192676 | 1/2000 |
| JP | 2003-277770 | 3/2002 |
| JP | 2003-049180 | 2/2003 |
| WO | 2005-007776 A1 | 1/2005 |

OTHER PUBLICATIONS

Adschiri et al. "Catalytic Hydrodesulfurization of Dibenzothiophene through Partial Oxidation and a Water-Gas Shift Reaction in Supercritical Water", published on Ind. Eng. Chem. Res., vol. 37, pp. 2634-2638, (1998).

Zhao et al. "Experimental Study on Vacuum Residuum Upgrading through Pyrolysis in Supercritical Water", published on Energy & Fuels, vol. 20, pp. 2067-2071, (2006).

M.A. McHugh & V.J. Krukonis "Supercritical Fluid Extraction", 2nd ed., Butterworth-Heinemann, (1994), pp. 339-416.

\* cited by examiner

PROCESS TO UPGRADE WHOLE CRUDE OIL BY HOT PRESSURIZED WATER AND RECOVERY FLUID

RELATED APPLICATIONS

This patent application claims priority to U.S. Provisional Patent Application Ser. Nos. 60/990,641; 60/990,662; 60/990,648; 60/990,670; and 60/990,658 filed on Nov. 28, 2007, which are all incorporated by reference in their entirety.

TECHNICAL FIELD OF THE INVENTION

The present invention relates to a process for upgrading whole crude oil by utilizing a recovery fluid and contacting the recovered crude oil with supercritical water fluid following a step-wise depressurizing step without the use of an external supply of hydrogen to produce low pour point, high value crude oil having low sulfur, low nitrogen, low metallic impurities, and high API gravity for use as hydrocarbon feedstock.

BACKGROUND OF THE INVENTION

World-wide demand for petroleum products has increased dramatically in recent years, depleting much of the known, high value, light crude oil reservoirs. Consequently, production companies have turned their interest towards using low value, heavy crude oil in order to meet the ever increasing demands of the future. However, because current refining methods using heavy crude oil are less efficient than those using light crude oils, refineries producing petroleum products from heavier crude oils must refine larger volumes of heavier crude oil in order to get the same volume of final product. Unfortunately though, this does not account for the expected increase in future demand. Further exacerbating the problem, many countries have implemented or plan to implement more strict regulations on the specifications of the petroleum-based transportation fuel. Consequently, the petroleum industry is seeking to find new methods for treating heavy crude oil prior to refining in an effort to meet the ever-increasing demand for petroleum feedstocks and to improve the quality of available crude oils used in refinery processes.

Whole crude oil, or raw crude oil, is the general term for crude oil produced from a production well prior to any refining processes. Depending upon the geographic characteristics of the production well, whole crude oil can vary greatly in composition from well to well. Unfortunately, many newly discovered wells tend to produce whole crude oil that contains increased amounts of heavy fractions and impurities other than carbon and hydrogen. Therefore, as more of the established, more valuable oil wells become depleted, the majority of our future supply will consist of inferior crude oil.

In general, high density crude oil provides lower amounts of the more valuable light and middle distillates. Additionally, high density crude oil generally contains increased amounts of impurities, such as sulfur, nitrogen and metals, all of which require increased amounts of hydrogen and energy for hydroprocessing in order to meet strict regulations on impurity content in the final product.

Generally speaking, heavy crude oils have a low API gravity, high asphaltene content, low middle distillate yield, high sulfur content, high nitrogen content, and high metal content. These properties make it difficult to refine heavy crude oil by conventional refining processes to produce end petroleum products with specifications that meet strict government regulations.

Traditional Cracking Methods

Low value heavy crude oil can be transformed into high value light crude oil by cracking the heavy fraction using various methods known in the art. Conventionally, cracking and cleaning have been conducted using a catalyst at elevated temperatures in the presence of hydrogen. However, this type of hydroprocessing has a definite limitation in processing heavy and sour crude oil when not using of large amounts of hydrogen and/or catalysts.

Additionally, distillation and/or hydroprocessing of heavy crude feedstock produce large amounts of asphaltene and heavy hydrocarbons, which must be further cracked and hydrotreated to be utilized. Conventional hydrocracking and hydrotreating processes for asphaltenic and heavy fractions also require high capital investments and substantial processing.

Many petroleum refineries perform conventional hydroprocessing after distilling crude oil into various fractions, with each fraction being hydroprocessed separately. Therefore, refineries must utilize the complex unit operations for each fraction. Further, significant amounts of hydrogen and expensive catalysts are utilized in conventional hydrocracking and hydrotreating processes. The processes are carried out under severe reaction conditions to increase the yield from the heavy crude oil towards more valuable middle distillates and to remove impurities such as sulfur, nitrogen, and metals.

Currently, large amounts of hydrogen are used to adjust the properties of fractions produced from conventional refining processes in order to meet required low molecular weight specifications for the end products; to remove impurities such as sulfur, nitrogen, and metal; and to increase the hydrogen-to-carbon ratio of the matrix. Hydrocracking and hydrotreating of asphaltenic and heavy fractions are examples of processes requiring large amounts of hydrogen, both of which result in the catalyst having a reduced life cycle.

Consequently, it would be beneficial to crack only the heavy portion of the whole crude oil using an efficient and low cost method, so that the entire whole crude stream would consist of the more valuable light fraction, resulting in reduced downstream refining costs.

Hydrothermal Cracking—Supercritical Water

Supercritical water has been utilized as a reaction medium for cracking of hydrocarbons with the addition of an external source of hydrogen. Water has a critical point at about 705° F. (374° C.) and about 22.1 MPa. Above these conditions, the phase boundary between liquid and gas for water disappears, with the resulting supercritical water exhibiting high solubility toward organic compounds and high miscibility with gases.

However, utilizing supercritical water to upgrade whole crude oil can have serious drawbacks if the whole crude oil contains increased quantities of heavy hydrocarbon molecules. Heavy hydrocarbon molecules dissolute into supercritical water much slower than their lighter counterparts. Furthermore, asphaltenic molecules, which have tangled structures, do not untangle easily with supercritical water. Consequently, the portions of the heavy hydrocarbon molecules that do not make contact with the supercritical water thermally decompose by themselves, resulting in large amounts of coke. Therefore, if the whole crude oil contains increased quantities of heavy hydrocarbons, reacting the whole crude oil with supercritical water using current methods leads to accumulation of coke inside the reactor.

When coke accumulates inside a reactor, the coke acts as an insulator and effectively blocks the heat from radiating throughout the reactor, leading to increased energy costs, since the operator must increase the operating temperature to offset for the build-up. Furthermore, accumulated coke can also increase the pressure drop throughout the process line, causing additional increases in energy costs.

One possible solution to prevent coke build-up is to increase the residence time of the whole crude oil within the reactor for dissolving whole parts of crude oil and decrease the temperature of the reactor; however, the overall economy and upgrading performance of the process would be reduced. Additionally, improvements in reactor design could be helpful; however, this would require large expenditures in design costs and might ultimately not prove beneficial. Therefore, there is a need for a process to facilitate the efficient contacting of heavy oil with supercritical water, which does not result in large amounts of coke or substantial increases in operating costs.

Enhanced Oil Recovery

Enhanced Oil Recovery (EOR) is a generic term for techniques for increasing the amount of oil that can be extracted from an oil field. Using EOR, approximately 30-60%, or more, of the reservoir's original oil can be extracted compared with 20-40% using primary and secondary recovery. Typical fluids used for EOR include gases, liquids, steam or other chemicals, with gas injection being the most commonly used EOR technique.

In a gas type EOR, gas such as carbon dioxide ($CO_2$), natural gas, or nitrogen is injected into the reservoir, whereupon it expands and thereby pushes additional crude oil to a production wellbore. Moreover, the gas dissolves in the crude oil, which lowers the crude oil's viscosity and improves the flow rate of the crude oil through a transferring line.

When $CO_2$ is pumped into an oil reservoir at a pressure sufficient to make it as dense as the oil in the reservoir, the $CO_2$ may become miscible with the oil. The pressure at which miscibility is first achieved is called the minimum miscibility pressure (MMP). At or above its MMP, $CO_2$ becomes an ideal solvent for oil, and because of this, it displaces oil from the reservoir much more efficiently than water. It picks up lighter hydrocarbon components, swells the total volume of oil, and reduces its viscosity so that it flows more easily.

$CO_2$ is currently one of the most promising crude oil recovery fluids because the dissolved $CO_2$ can be easily separated from the recovered crude oil after production by depressurization. Of course, the solubility of $CO_2$ in crude oil depends heavily on pressure, temperature, gas to oil ratio and composition of the crude oil. However, the simplest way to control the phase behavior of $CO_2$ and crude oil is to vary the pressure. At low pressures, $CO_2$ shows very low solubility toward crude oil, in particular, the heavy fraction. Additionally, the dissolving of $CO_2$ in the crude oil causes the crude oil to swell, resulting in increased solubility of asphaltenic species that may be in the crude oil.

As stated earlier, one of the shortcomings of contacting a high density whole crude oil with supercritical water was the production of large quantities of low value coke. This coke production was caused by the inability of the supercritical water to effectively penetrate throughout the high density whole crude oil, particularly the heavy fraction of the whole crude oil. However, since $CO_2$ dissolved in crude oil causes the crude oil to swell, and thus become less dense, combining a $CO_2$ EOR method with supercritical water allows for upgrading the whole crude oil without the production of considerable amounts of coke by facilitating dissolution of the heavy fraction into the supercritical water.

Processing an entire stream of whole crude oil is economically unfeasible as the throughputs are too high. Therefore, it would be desirable to have a simple and economical process to combine a $CO_2$ EOR method of recovery with a supercritical water cracking method, while contacting only the heavy portion of the whole crude oil in order to limit coke conversion, increase overall well production, and produce a final crude oil that is mostly higher value, light fraction.

Furthermore, it would be desirable to have an improved process for upgrading whole crude oils with supercritical water fluid that requires neither an external supply of hydrogen nor the presence of an externally supplied catalyst. It would be advantageous to create a process and apparatus that allows for the upgrade of the whole crude oil, rather than the individual fractions, to reach the desired qualities such that the refining process and various supporting facilities can be simplified.

Additionally, it would be beneficial to have an improved process that did not require complex equipment or facilities associated with other processes that require hydrogen supply or coke removal systems so that they may be implemented at the production site.

SUMMARY OF THE INVENTION

The present invention is directed to a process that satisfies at least one of these needs. The present invention provides a process for upgrading a portion of a whole crude oil stream by contacting only a section of the whole crude oil stream with supercritical water. In particular, the present invention utilizes an EOR process to recover the whole crude oil, wherein the recovered whole crude oil is depressurized in a step-wise manner such that the heavy fraction of the whole crude oil is no longer miscible with the recovery fluid. The heavy fraction stream, which contains a small amount of dissolved recovery fluid, is then sent to a suitable device wherein the heavy fraction stream is contacted with water under supercritical conditions. Because the small amount of dissolved recovery fluid causes the heavy fraction stream to swell, the heavy fraction stream can be upgraded more easily with supercritical water, resulting in less coke formation and reduced operating costs. Furthermore, since the process only upgrades a portion of the whole crude oil, the process of the present invention can handle higher throughputs, allowing it to be employed at the production site and further reducing overall operating expenses.

In an embodiment of the present invention, the process for upgrading whole crude oil can include injecting into an injection well a pressurized recovery fluid at a pressure exceeding the recovery fluid's minimum miscibility pressure such that the recovery fluid is operable to sweep an underground formation to enhance recovery of whole crude oil from a production well. The recovery fluid being intimately mixed with the whole crude oil upon recovery from the production well to create a high pressure stream, wherein the whole crude oil comprises a light fraction and a heavy fraction.

The high pressure stream is then depressurized under conditions to maintain miscibility of a small portion of the recovery fluid within the heavy fraction, and the heavy fraction is separated from the high pressure stream to form a light crude oil stream and a heavy fraction stream. The light crude oil stream contains a significant portion of the recovery fluid. The recovery fluid can be separated from the light crude oil stream to form a light fraction stream by any suitable device, including a flash evaporator.

The heavy fraction stream is reformed into a reformed heavy fraction by contacting the heavy fraction stream with a water feed stream under supercritical conditions, wherein the reformed heavy fraction has reduced amounts of asphaltene, sulfur, nitrogen or metal containing substances as compared to the whole crude oil.

In an alternate embodiment, the light fraction stream created after separating the significant portion of the recovery fluid from the light crude oil stream can be combined with the reformed heavy fraction to create upgraded whole crude oil, wherein the upgraded whole crude oil has higher API gravity and reduced amounts of asphaltene, sulfur, nitrogen or metal containing substances as compared to the whole crude oil.

In an additional embodiment, the recovery fluid is selected from the group consisting of gas, liquid, steam, chemicals, and combinations thereof. In a further embodiment, the gas is selected from the group consisting of carbon dioxide, nitrogen, natural gas, and combinations thereof. In a further embodiment, carbon dioxide is the preferred gas. For purposes of this invention, gas refers to a substance that is neither a solid nor a liquid at ordinary temperatures and pressures.

In an alternate embodiment, the step of reforming the heavy fraction stream further includes combining the heavy fraction with the water feed stream to create a mixture, wherein the mixture is created in the absence of externally supplied hydrogen. The temperature of the mixture is then modified such that the temperature of the mixture in a reaction zone is at or above the critical temperature of water, such that at least a portion of hydrocarbons in the mixture undergo cracking to create a hot adapted mixture. The hot adapted mixture is cooled and depressurized to create a pressure-reduced adapted mixture. The pressure-reduced adapted mixture is separated into a gas portion and a liquid portion, and the liquid portion is then separated into a recovered water stream and the reformed heavy fraction. In an alternate embodiment, the mixture is created in the absence of an externally supplied catalyst. In another alternate embodiment, the reaction zone comprises a main reactor having an interior portion, wherein the main reactor is a vertically oriented reactor, such that the pre-heated mixture flows downwardly through the vertically oriented reactor. In a further embodiment, the hot adapted mixture is depressurized by a pressure regulating device. Preferably, the pressure regulating device is at least one back pressure regulator, and more preferably two or more back pressure regulators configured in a parallel fashion.

In an alternate embodiment, the step of reforming the heavy fraction stream can include increasing the pressure of the water feed stream and the heavy fraction stream to a target pressure that exceeds the critical pressure of water. The heavy fraction stream is mixed with the water feed stream at a slightly elevated temperature to form the mixture, the temperature being selected in a range such that mixture at the slightly elevated temperature is readily capable of being pumped. Slightly elevated temperatures are temperatures that are slightly elevated in comparison to ambient temperature. Exemplary elevated temperatures include temperatures in the range of 50-150 degrees C. The mixture, which continues to be maintained above the critical pressure of water, is pumped to the heating zone. The mixture is heated in the heating zone to a temperature in the range of about 150° C. to 350° C. to form the pre-heated mixture. The pre-heated mixture is then fed into the reaction zone. The temperature is increased within the reaction zone to a target temperature that is at or above the critical temperature of water, such that at least some of the hydrocarbons of the pre-heated mixture undergo cracking, forming the hot adapted-mixture, the reaction zone being essentially free of an externally-provided catalyst and essentially free of an externally-provided hydrogen source. The hot adapted-mixture is cooled and depressurized to form a pressure reduced adapted-mixture. The pressure reduced adapted-mixture is separated into the gas portion and the liquid portion using at least one separator, and the liquid portion is then separated into the reformed heavy fraction and recovered water stream using at least one oil-water separator.

In an additional embodiment, the recovered water stream can be oxidized under supercritical conditions to form the treated water stream, and the treated water stream can then be recycled by combining the treated water stream with the water feed stream. In another additional embodiment of the present invention, the main reactor can be the vertically oriented reactor, such that the pre-heated mixture flows downwardly through the vertically oriented reactor. In a further embodiment, the hot adapted mixture is depressurized by the pressure regulating device. Preferably, the pressure regulating device is at least one back pressure regulator, and more preferably two or more back pressure regulators configured in a parallel fashion.

In an alternate embodiment, the step of reforming the heavy fraction stream can include increasing the pressure of the water feed stream and the heavy fraction stream to a target pressure that exceeds the critical pressure of water. The water feed stream is then heated to an elevated temperature to form a heated water stream, such that the heated water stream is in a supercritical state. The heavy fraction stream is mixed with the heated water stream in the mixing zone to form the pre-heated mixture, wherein the mixing zone is at a location near the reaction zone, such that the pre-heated mixture remains in a supercritical state, and the pre-heated mixture is then fed into the reaction zone. The temperature is increased within the reaction zone to the target temperature that is at or above the critical temperature of water, such that at least some of the hydrocarbons of the pre-heated mixture undergo cracking, forming the hot adapted-mixture, the reaction zone being essentially free of an externally-provided catalyst and essentially free of an externally-provided hydrogen source. The hot adapted-mixture is cooled and depressurized to form the cooled adapted-mixture. The cooled adapted-mixture is depressurized to form the pressure reduced adapted-mixture. The pressure reduced adapted-mixture is separated into the gas portion and the liquid portion using at least one liquid-gas separator, and the liquid portion is separated into the reformed heavy fraction and the recovered water stream using at least one oil-water separator.

In an additional embodiment, the recovered water stream can be oxidized under supercritical conditions to form the treated water stream, and the treated water stream can then be recycled by combining the treated water stream with the water feed stream. In another additional embodiment of the present invention, the main reactor can be a vertically oriented reactor, such that the pre-heated mixture flows downwardly through the vertically oriented reactor, In a further embodiment, the hot adapted mixture is depressurized by the pressure regulating device. Preferably, the pressure regulating device is at least one pressure back pressure regulator, and more preferably two or more back pressure regulators configured in a parallel fashion.

The process of the present invention does not require an external supply of hydrogen and/or catalyst to upgrade hydrocarbons. The absence of external catalyst creates a cost effective process by avoiding the cost of catalyst as well as the operational drawbacks of using external catalyst. Also, the supercritical water fluid in the process of the present invention suppresses formation of coke as compared to other thermal cracking methods and as a result increases liquid yield.

Furthermore, supercritical water fluid facilitates mass transfer which increases reaction speed. In one embodiment, the residence time of the pre-heated mixture within the reaction zone is between 0.1 and 30 minutes, and more preferably between 5 and 15 minutes.

The present invention also provides for an apparatus for upgrading whole crude oil. In one embodiment of the present invention, the apparatus has an injection well, a production well, a fractionating device and a hydrothermal reforming facility. In one embodiment, the injection well is in fluid communication with an underground formation. Furthermore, the injection well is operable to receive a pressurized recovery fluid and introduce the pressurized recovery fluid into the underground formation. The pressurized recovery fluid intimately mixes with whole crude oil within the underground formation forming a high pressure stream, with the high pressure stream being made up of the recovery fluid and the whole crude oil, wherein the whole crude oil comprises a light fraction and a heavy fraction. In one embodiment, the production well is in fluid communication with the underground formation such that the production well is operable to produce the high pressure stream from the underground formation.

In one embodiment of the present invention, the fractionating device is in fluid communication with the production well. The fractionating device is operable to depressurize the high pressure stream in a step-wise manner such that the heavy fraction is separated from the high pressure stream to form a light crude oil stream and a heavy fraction stream, while a small portion of the recovery fluid maintains miscibility within the heavy fraction, and the light crude oil stream contains a significant portion of the recovery fluid.

In one embodiment of the present invention, the hydrothermal reforming facility is operable to reform the heavy fraction stream into a reformed heavy fraction by contacting the heavy fraction stream with a water feed stream under supercritical conditions, resulting in the reformed heavy fraction having reduced amounts of heavy fraction, asphaltene, sulfur, nitrogen or metal containing substances as compared to the whole crude oil. In other embodiments of the present invention, the hydrothermal reforming facility has a mixing zone, a pre-heating zone, a high pressure pumping means, and a reaction zone. In one embodiment, the mixing zone includes an ultrasonic wave generator. Furthermore, the mixing zone is operable to combine heavy oil with a water feed at a slightly elevated temperature. The pre-heating zone is fluidly connected with the mixing zone, with the pre-heating zone being operable to heat its contents to a temperature up to about 350° C. The high pressure pumping means is operable to increase pressure within the apparatus to exceed the critical pressure of water. The reaction zone comprises an interior portion of a main reactor, wherein the reaction zone is fluidly connected with the pre-heating zone, and the main reactor is operable to withstand a temperature that is at least as high as the critical temperature of water. Additionally, the main reactor is operable to withstand pressure in excess of the critical pressure of water. In one embodiment of the present invention, the reaction zone is essentially free of an externally-provided catalyst and essentially free of an externally-provided hydrogen source.

In other embodiments of the present invention, the hydrothermal reforming facility can also include a pressure regulating device, a liquid-gas separator fluidly connected to the pressure regulating device, and a water-oil separator that is fluidly connected to the liquid-gas separator. The liquid-gas separator being operable to create a liquid stream and a gas stream, and the water-oil separator being operable to create a recovered water stream and an upgraded hydrocarbon stream. In an additional embodiment of the present invention, the hydrothermal reforming facility can also include an oxidation reactor that is fluidly connected with the water-oil separator via the recovered water stream. The oxidation reactor is operable to clean the recovered water before the recovered water is recycled and combined with the water feed.

Additionally, the process and apparatus of the present invention can be easily utilized at the production site of the whole crude oil because various embodiments of the present invention do not require complex equipment or facilities associated with other processes that require hydrogen supply or coke removal systems. Moreover, the low pour point and high API gravity crude oil has low levels of sulfur, nitrogen, and metals, which increases the value of the feedstock because further, costly hydroprocessing can thereby be minimized.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The present invention provides a process for converting whole crude oil into more valuable crude oil feedstock without an external supply of hydrogen or catalysts. The process generally includes injecting the recovery fluid under pressure into the injection well such that the recovery fluid sweeps an underground formation and thereby increases overall production from the production well. The process further includes depressurizing the recovered whole crude oil, which is intimately mixed with the recovery fluid, in a step-wise fashion such that the light fraction and heavy fraction that make up the whole crude oil are separated. The heavy fraction can then be sent to a hydrothermal upgrading facility for reformation.

The reformation step generally includes contacting the heavy fraction with hot pressurized water to produce a reformed heavy fraction having a higher API gravity and reduced amounts of asphaltene, sulfur, nitrogen or metal containing substances as compared to the whole crude oil. The reformation step is conducted in the absence of added hydrogen. The hot pressurized water is above the critical temperature and pressure of water and exhibits unique properties that are used in this invention to achieve desired end results.

Hot pressurized water provides a reaction medium for the heavy components to be cracked into low molecular weight hydrocarbons through facilitating mass diffusion, heat transfer, intra- or inter-molecular hydrogen transfer, stabilizing radical compounds for suppressing coke formation and removing impurities such as sulfur, nitrogen and metal containing molecules. While the exact mechanism of the impurity removal has not been identified, the impurities seem to be absorbed into the water phase or are concentrated in the coke or heavy fraction of the upgraded products. Through the use of supercritical water, these impurities are separated from crude oil to avoid deleterious effects.

The process further includes separating the recovery fluid from the light crude oil stream to form the light fraction stream, and in one embodiment, the light fraction stream is combined with the reformed heavy fraction to form upgraded whole crude oil. Furthermore, the recovery fluid separated from the light crude oil stream can be recovered and recycled for re-use during the injecting step.

The above embodiment of the present invention provides for an efficient process to extract whole crude oil from the ground and upgrade the low value, heavy component of the whole crude oil, all while keeping throughputs at normal levels. This invention is advantageous because it does not require expensive catalysts to reform the heavy fraction. Furthermore, the present invention provides a practical way to fractionate the whole crude oil into heavy and light fractions without using more conventional and more expensive distillation equipment. Moreover, the present invention allows a production company to upgrade the whole crude oil at the production site rather than transferring the whole crude oil to a remote site for upgrading, further reducing costs.

Figure 1:
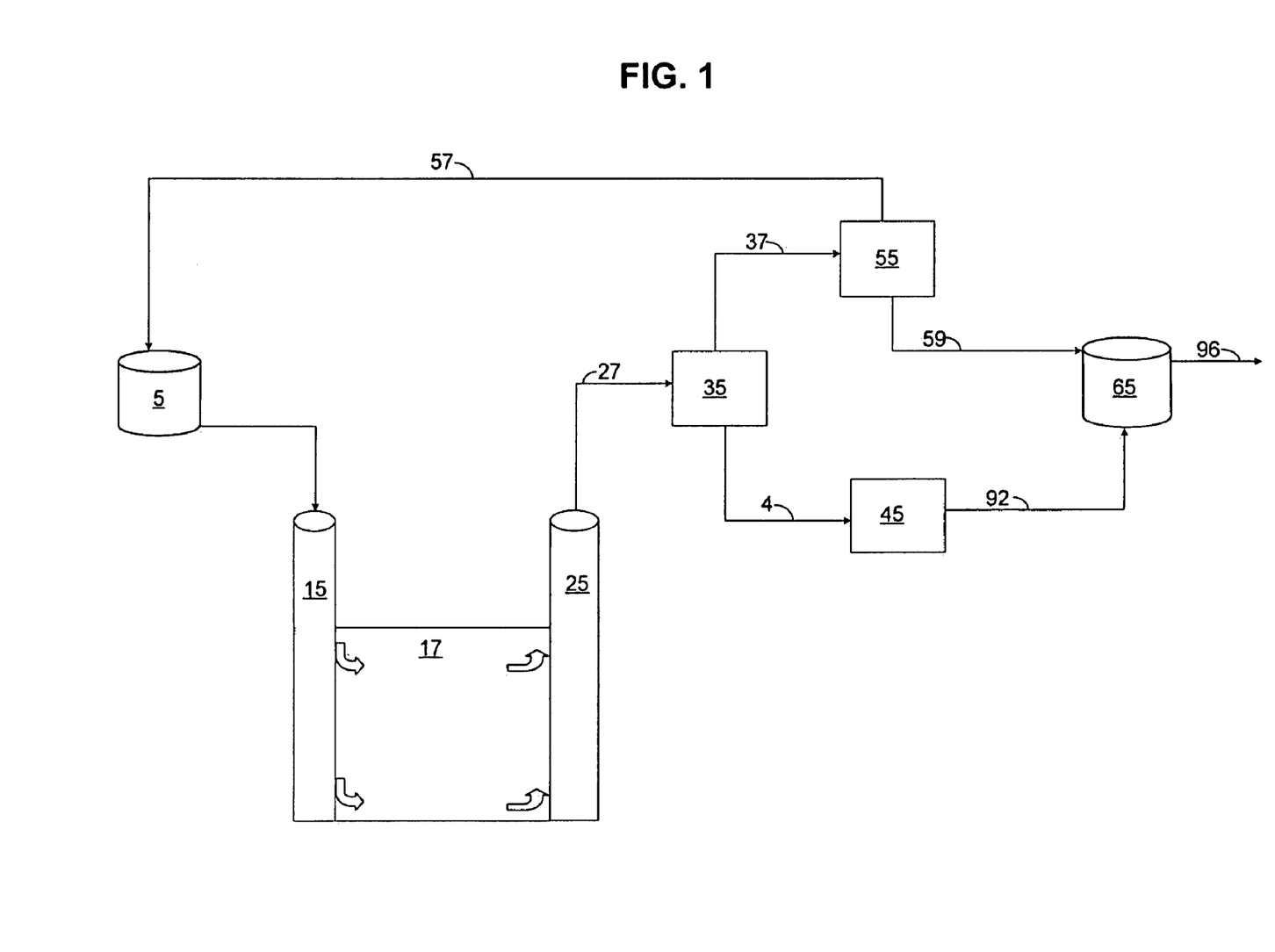
FIG. 1 is a perspective view of a process diagram according to an embodiment of the present invention.

Now turning to FIG. 1, which represents an embodiment of the present invention wherein carbon dioxide is the recovery fluid. Carbon dioxide, which is stored in carbon dioxide storage tank [5], is compressed and injected into injection well [15] via compressed carbon dioxide line [7]. The pressure of the compressed carbon dioxide is maintained above the minimum miscibility pressure (MMP) to ensure the miscibility of the carbon dioxide in the whole crude oil that is in underground formation [17]. The MMP will vary from well to well; however, the MMP for carbon dioxide generally ranges from 2000 psig to 4000 psig. Therefore, the operating pressure of the carbon dioxide injection is typically from 2000 psig to 5000 psig. Water can also be injected with the carbon dioxide to facilitate crude oil recovery, which is the well known Water Alternating-Gas design (WAG), and is incorporated herein by reference.

The miscible carbon dioxide and whole crude oil reach the earth's surface via production well [25], and this high pressure stream [27] then enters fractionating device [35], wherein the pressure is reduced to a point below the MMP, but above a certain value, such that the heavy portion of the high pressure stream becomes immiscible with the carbon dioxide. In one embodiment, the pressure of fractionating device [35] is maintained at a pressure within a pressure range that is near the critical pressure of carbon dioxide (1073 psig). The preferred pressure range is 500 psig to 2000 psig, and more preferably 1,000 psig to 1,300 psig. The temperature within fractionating device [35] is maintained within the range of 0° C. to 50° C., and preferably 20° C. to 40° C.

This heavy portion, referred to as heavy fraction stream [4], which still contains a small amount of carbon dioxide, is then sent to hydrothermal reforming facility [45], whereby heavy fraction stream [4] is contacted with water under supercritical conditions, resulting in reformed heavy fraction [92]. The presence of a small amount of carbon dioxide within heavy fraction stream [4] provides two benefits. Firstly, the carbon dioxide dissolved with the heavy fraction stream lowers the viscosity, allowing the stream to more easily flow. Secondly, as mentioned earlier, the dissolved carbon dioxide lowers the density of the heavy fraction, allowing the supercritical water to more efficiently interact with the heavy oil molecules, which results in better conversion, reduced amounts of coke production, and lower operating costs.

Light crude oil stream [37], which comprises a substantial portion of the carbon dioxide and light fractions of the whole crude oil, exits fractionating device [35] and enters carbon dioxide separator [55], wherein the remaining carbon dioxide is removed by lowering the pressure to around atmospheric; leaving light fraction stream [59]. The separated carbon dioxide is recycled back to carbon dioxide storage tank [5] via recycled carbon dioxide line [57]. Light fraction stream [59] is then fed into upgraded whole crude oil storage tank [65], where it is combined with reformed heavy fraction [92] for storage. The final product, upgraded whole crude oil [96] can then be transported for further refining.

Figure 2:
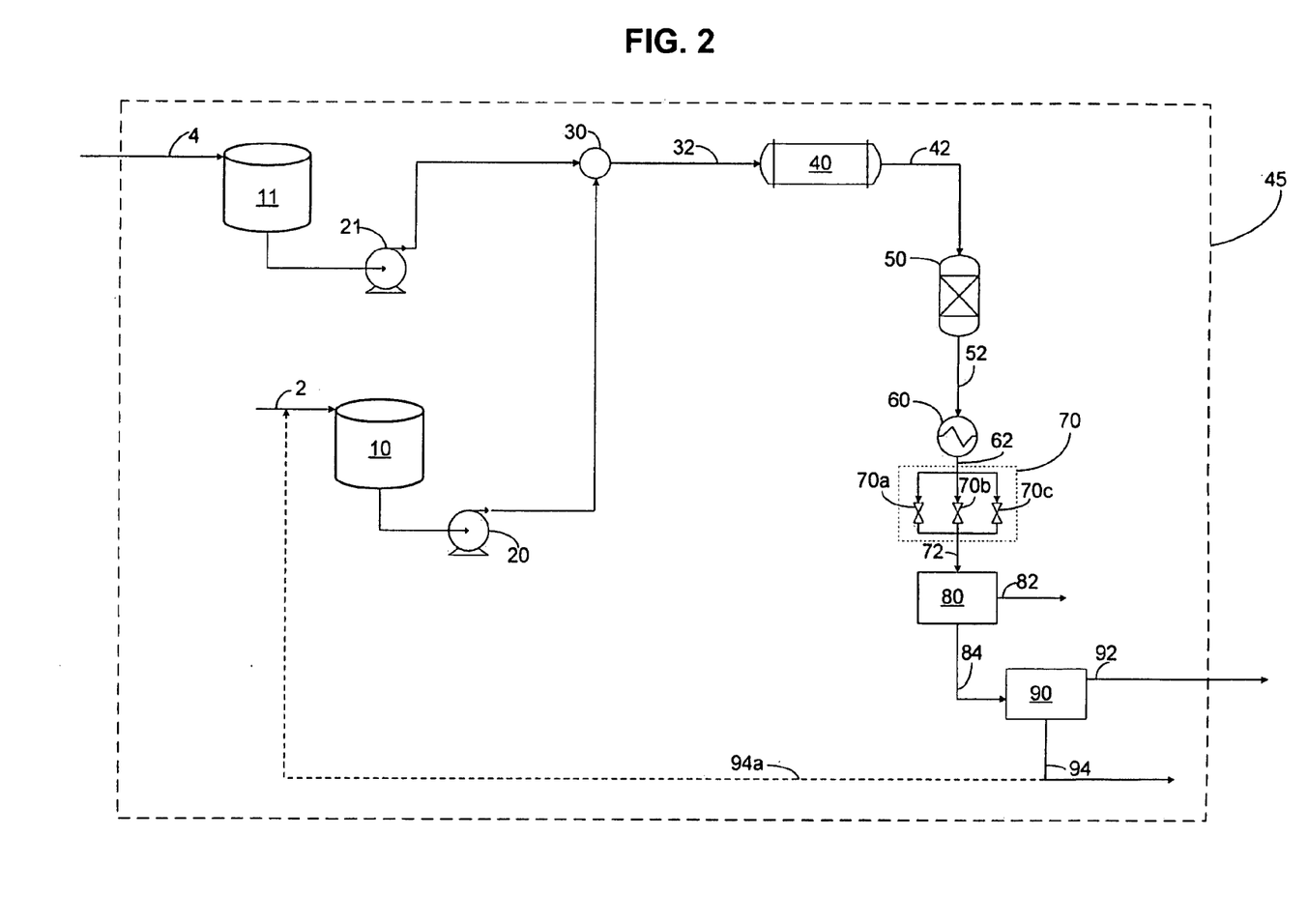
FIG. 2 is a more detailed view of an embodiment of the reformation step of the process.

FIG. 2 represents an embodiment of hydrothermal reforming facility [45]. Water feed stream [2] is fed into water storage tank [10], where water feed stream [2] is subsequently pumped into the process at mixing zone [30] using high pressure metering water pump [20]. Heavy fraction stream [4] is similarly fed into heavy fraction storage tank [11], where heavy fraction stream [4] is subsequently pumped into the process at mixing zone [30] using high pressure metering heavy fraction pump [21]. Prior to mixing zone [30], heavy fraction stream [4] is at a temperature that allows for flow; however, the temperature preferably does not exceed 150 degrees C. The two streams combine at mixing zone [30] to form mixture [32]. Mixture [32] is then fed into heating zone [40], wherein the temperature is increased to a temperature within the range of 150 to 400 degrees C., more preferably 150 to 350 degrees C., to form pre-heated mixture [42].

Pre-heated mixture [42] is then fed into main reactor [50], wherein the temperature and pressure are near to or exceed the critical point of water, such that at least some of the hydrocarbons of pre-heated mixture [42] undergo cracking, forming hot adapted-mixture [52], main reactor [50] having an interior portion that is essentially free of an externally-provided catalyst and essentially free of an externally-provided hydrogen source. Hot adapted-mixture [52] is then cooled using any acceptable means of cooling [60], preferably a heat exchanger, creating cooled adapted-mixture [62]. Cooled adapted-mixture [62] is then depressurized by pressure regulating device [70] to create a pressure reduced adapted-mixture [72]. In one embodiment, pressure regulating device [70] comprises at least two back pressure regulators, and more preferably three back pressure regulators [70a, 70b, 70c] connected in a parallel fashion. This arrangement advantageously provides for continued operation in the event the primary back pressure regulator becomes plugged. Pressure reduced adapted-mixture [72] then enters liquid-gas separator [80], wherein pressure reduced adapted-mixture [72] is separated into gas portion [82] and liquid portion [84]. Liquid portion [84] is then fed into oil-water separator [90] to yield reformed heavy fraction [92] and recovered water [94]. In an alternate embodiment, recovered water [94] can be recycled either before or after water storage tank [10] and re-used as water feed stream [2].

Figure 3:
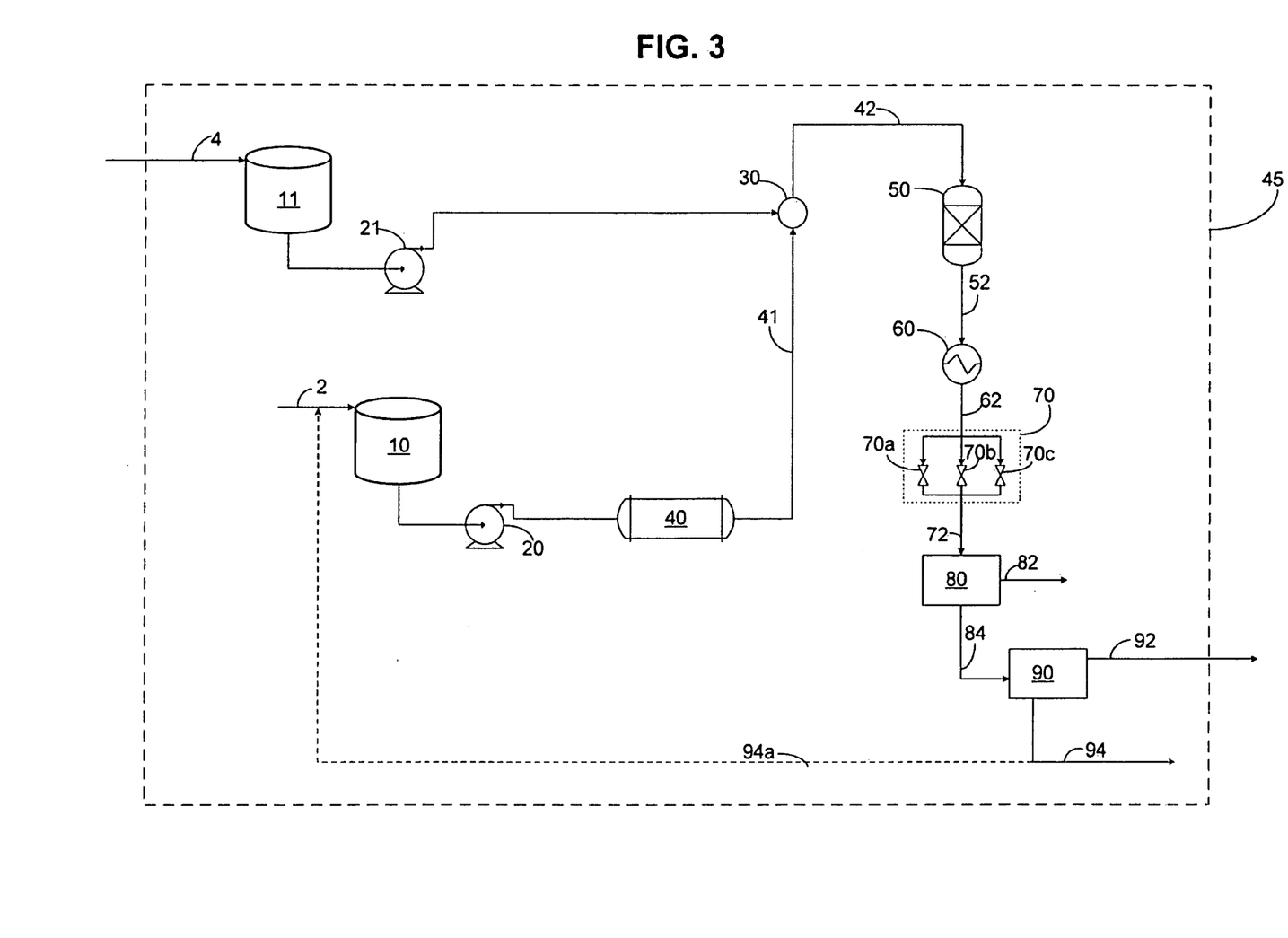
FIG. 3 is a more detailed view of an alternate embodiment of the reformation step of the process.

FIG. 3 represents one embodiment in which water feed stream [2] is pre-heated to supercritical conditions prior to mixing zone [30]. In this embodiment, water feed stream [2] is fed into water storage tank [10], where water feed stream [2] is subsequently pumped into the process using high pressure metering water pump [20]. However, instead of first mixing with heavy fraction stream [4], water feed stream [2] undergoes heating in heating zone [40] to form heated water stream [41], wherein heated water stream [41] is in a supercritical state.

Heavy fraction stream [4] is similarly fed into highly waxy crude oil storage tank [11], where heavy fraction stream [4] is subsequently pumped into the process at mixing zone [30]

using high pressure metering heavy fraction pump [21]. Prior the mixing zone [30], heavy fraction stream [4] is at a temperature that allows for flow; however, preferably not exceeding 150 degrees C. Heavy fraction stream [4] and heated water stream [41] combine at mixing zone [30], which is preferably near main reactor [50], to create pre-heated mixture [42].

Pre-heated mixture [42] enters main reactor [50], wherein the temperature and pressure are near to or exceed the critical point of water, such that at least some of the hydrocarbons of pre-heated mixture [42] undergo cracking, forming hot adapted-mixture [52], main reactor [50] being essentially free of an externally-provided catalyst and essentially free of an externally-provided hydrogen source. Hot adapted-mixture [52] is then cooled using any acceptable means of cooling [60], preferably a heat exchanger, creating cooled adapted-mixture [62]. Cooled adapted-mixture [62] is then depressurized by pressure regulating device [70] to create pressure reduced adapted-mixture [72]. In one embodiment, pressure regulating device [70] comprises at least two back pressure regulators, and more preferably three back pressure regulators [70a, 70b, 70c] connected in a parallel fashion. This arrangement advantageously provides for continued operation in the event the primary back pressure regulator becomes plugged. Pressure reduced adapted-mixture [72] then enters liquid-gas separator [80], wherein pressure reduced adapted-mixture [72] is separated into gas portion [82] and liquid portion [84]. Liquid portion [84] is then fed into oil-water separator [90] to yield reformed heavy fraction [92] and recovered water [94]. In an alternate embodiment, recovered water [94] can be recycled either before or after water storage tank [10] and re-used as water feed stream [2].

Figure 4:
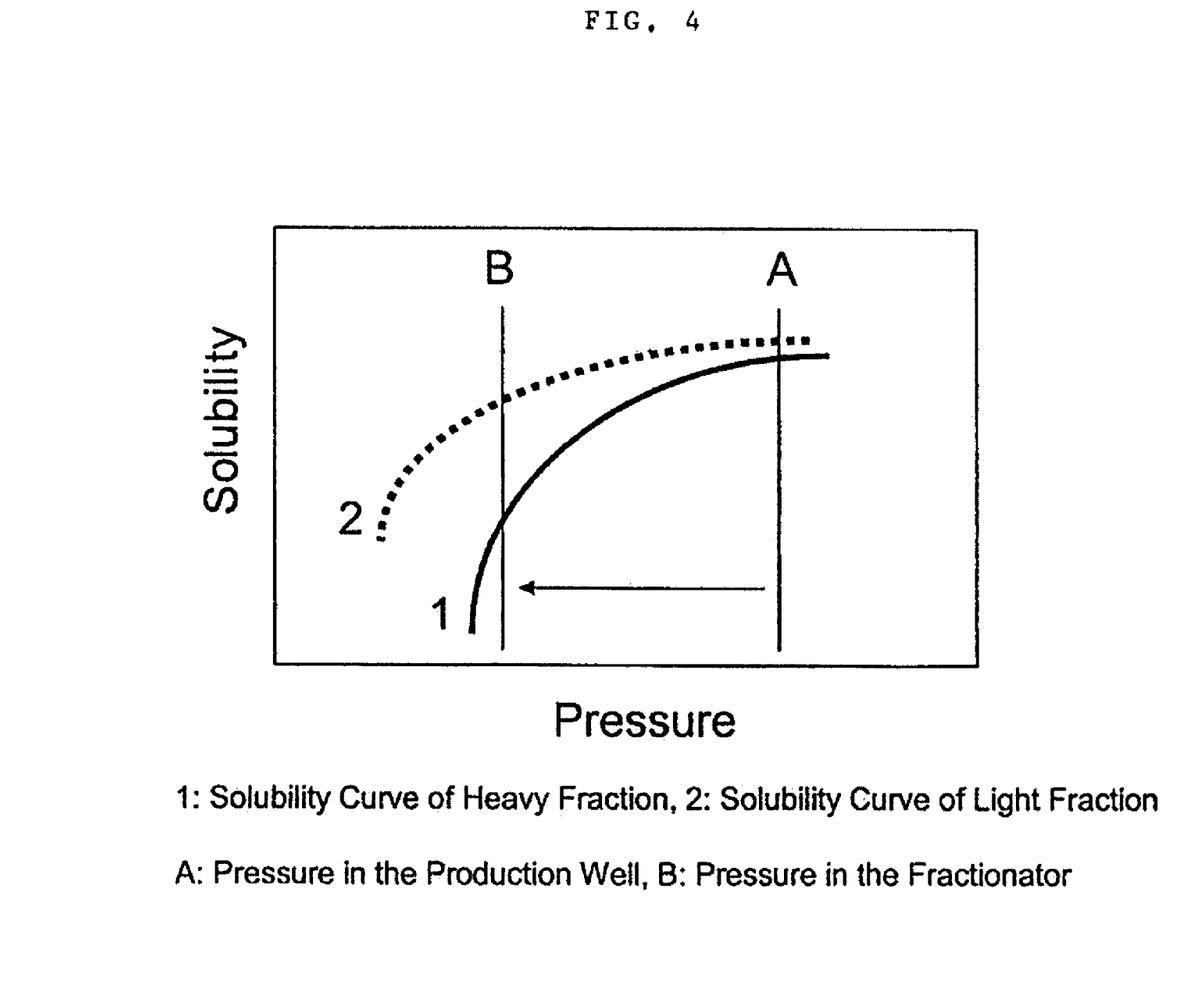
FIG. 4 shows the solubility curve of carbon dioxide in both a light fraction and a heavy fraction.

FIG. 4 shows the general solubility curve of carbon dioxide as a function of pressure. Generally speaking, carbon dioxide dissolves more easily in oil fractions with lower molecular weighs than oil fractions with higher molecular weights. Curve 1 represents the solubility curve of carbon dioxide into heavy fractions, while curve 2 represents the solubility curve of carbon dioxide into light fractions. In the present invention, pressure A represents the pressure of the high pressure stream exiting the production well, with pressure B being the pressure of fractionating device [35] in FIG. 1.

As shown in FIG. 4, the solubility of carbon dioxide in the heavy fraction decreases more rapidly than it does in the light fraction. This difference in solubility is what allows the invention to successfully separate the heavy fraction from the rest of the high pressure stream. In practice, pressure A should exceed the MMP of the recovery fluid, which can be measured or predicted.

Pressure B can be optimally selected by conducting a series of experiments. Intuitively, if pressure B is too high, less of the heavy fraction is separated, which limits overall conversion; however, if pressure B is set too low, a relatively significant portion of the light fraction is sent to the hydrothermal reforming facility, which requires larger equipment and more power to accommodate the extra flow of the light fraction throughout the hydrothermal facility. In either case, overall efficiency of the process is reduced. Therefore, experiments should be conducted to optimize the operating pressure for fractionating device [35] of FIG. 1, taking into account, for example, the type of recovery fluid used, the unique characteristics of the whole crude oil, equipment characteristics, and desired throughputs, among the many other variables which should be apparent to those of ordinary skill in the art.

While the invention has been shown or described in only some of its forms, it should be apparent to those skilled in the art that it is not so limited, but is susceptible to various changes without departing from the scope of the invention.

I claim:

1. A process for upgrading whole crude oil, the process comprising the steps of:
    injecting into an injection well a pressurized recovery fluid at a pressure exceeding the recovery fluid's minimum miscibility pressure such that the recovery fluid is operable to sweep an underground formation to enhance recovery of whole crude oil from a production well, the recovery fluid being intimately mixed with the whole crude oil upon recovery from the production well to create a high pressure stream, wherein the whole crude oil comprises a light fraction and a heavy fraction;
    depressurizing the high pressure stream under conditions to maintain miscibility of a small portion of the recovery fluid within the heavy fraction, and separating the heavy fraction from the high pressure stream to form a light crude oil stream and a heavy fraction stream, the light crude oil stream containing a significant portion of the recovery fluid;
    separating the recovery fluid from the light crude oil stream to form a light fraction stream;
    reforming the heavy fraction stream into a reformed heavy fraction by contacting the heavy fraction stream with a water feed stream under supercritical conditions, wherein the reformed heavy fraction has reduced amounts of heavy fraction, asphaltene, sulfur, nitrogen or metal containing substances as compared to the whole crude oil.

2. The process of claim 1, further comprising combining the light fraction stream with the reformed heavy fraction to create upgraded whole crude oil, wherein the upgraded whole crude oil contains has reduced amounts of heavy fraction asphaltene, sulfur, nitrogen or metal containing substances as compared to the whole crude oil.

3. The process of claim 1 wherein the recovery fluid is selected from the group consisting of gas, liquid, steam, chemicals, and combinations thereof.

4. The process of claim 1 wherein the recovery fluid is a gas selected from the group consisting of carbon dioxide, nitrogen, natural gas, and combinations thereof.

5. The process of claim 1 wherein the recovery fluid is carbon dioxide.

6. The process of claim 1 wherein the step of separating the recovery fluid from the light crude oil stream comprises a flash evaporator.

7. The process of claim. 1, wherein the step of reforming the heavy fraction stream further comprises:
    combining the heavy fraction with the water feed stream to create a mixture, wherein the mixture is created in the absence of externally supplied hydrogen;
    modifying the temperature of the mixture such that the temperature of the mixture in a reaction zone is at or above the critical temperature of water, such that at least a portion of hydrocarbons in the mixture undergo cracking to create a hot adapted mixture;
    cooling and depressurizing the hot adapted mixture to create a pressure-reduced adapted mixture;
    separating the pressure-reduced adapted mixture into a gas portion and a liquid portion; and
    separating the liquid portion into a recovered water stream and the reformed heavy fraction.

8. The process of claim 7, wherein the mixture is created in the absence of an externally supplied catalyst.

9. The process of claim 7, wherein the reaction zone comprises a main reactor having an interior portion , the main reactor comprising a vertically oriented reactor, such that the pre-heated mixture flows downwardly through the vertically oriented reactor.

10. The continuous process of claim 7, wherein the hot adapted mixture is depressurized by a pressure regulating device, the pressure regulating device comprises at least one back pressure regulator.

11. The continuous process of claim 10, wherein the pressure regulating device is comprised of two or more back pressure regulators configured in a parallel fashion.

12. The process of claim 1, wherein the step of reforming the heavy fraction stream further comprises:
increasing the pressure of the water feed stream and the heavy fraction stream to a target pressure, the target pressure exceeding the critical pressure of water;
mixing the heavy fraction stream with the water feed stream at a slightly elevated temperature to form a mixture, the temperature being selected in a range such that mixture at the slightly elevated temperature is readily capable of being pumped;
pumping the mixture to a heating zone at a pressure exceeding the critical pressure of water;
heating the mixture in the heating zone to a temperature in the range of about 150° C. to 350° C. to form a pre-heated mixture;
feeding the pre-heated mixture into a reaction zone;
increasing the temperature within the reaction zone to a target temperature that is at or above the critical temperature water, such that a portion of hydrocarbons of the pre-heated mixture undergo cracking, forming a hot adapted-mixture, the reaction zone being essentially free of an externally-provided catalyst and essentially free of an externally-provided hydrogen source;
cooling and depressurizing the hot adapted-mixture to form a pressure reduced adapted-mixture;
separating the pressure reduced adapted-mixture into a gas portion and a liquid portion using at least one separator; and
separating the liquid portion into the reformed heavy fraction and a recovered water stream using at least one oil-water separator.

13. The process of claim 12, further comprising:
oxidizing the recovered water stream under supercritical conditions to form a treated water stream; and
recycling the treated water stream by combining the treated water stream with the water feed stream.

14. The process of claim 1, wherein the step of reforming the heavy fraction stream further comprises:
increasing the pressure of the water feed stream and the heavy fraction stream to a target pressure exceeding the critical pressure of water;
heating the water feed stream to an elevated temperature to form a heated water stream, such that the heated water stream is in a supercritical state;
mixing the heavy fraction stream with the heated water stream in a mixing zone to form a pre-heated mixture, wherein the mixing zone is at a location near a reaction zone, such that the pre-heated mixture remains in a supercritical state;
feeding the pre-heated mixture into the reaction zone;
increasing the temperature within the reaction zone to a target temperature that is at or above the critical temperature water, such that at least some of the hydrocarbons of the pre-heated mixture undergo cracking, forming a hot adapted-mixture, the reaction zone being essentially free of an externally-provided catalyst and essentially free of an externally-provided hydrogen source;
cooling and depressurizing the hot adapted-mixture to form a pressure reduced adapted-mixture;
separating the pressure reduced adapted-mixture into a gas portion and a liquid portion using at least one liquid-gas separator; and
separating the liquid portion into the reformed heavy fraction and a recovered water stream using at least one oil-water separator.

15. The process of claim 14, further comprising:
oxidizing the recovered water stream under supercritical conditions to form a treated water stream; and
recycling the treated water stream by combining the treated water stream with the water feed stream.

16. An apparatus for upgrading whole crude oil, the apparatus comprising:
an injection well in fluid communication with an underground formation, the injection well operable to receive a pressurized recovery fluid and introduce the pressurized recovery fluid into the underground formation wherein the pressurized recovery fluid intimately mixes with whole crude oil within the underground formation forming a high pressure stream, the high pressure stream comprising the recovery fluid and whole crude oil, wherein the whole crude oil comprises a light fraction and a heavy fraction;
a production well in fluid communication with the underground formation, the production well operable to produce the high pressure stream from the underground formation;
a fractionating device in fluid communication with the production well, wherein the fractionating device is operable to depressurize the high pressure stream in a step-wise manner such that the heavy fraction is separated from the high pressure stream to form a light crude oil stream and a heavy fraction stream, wherein a small portion of the recovery fluid maintains miscibility within the heavy fraction, and wherein the light crude oil stream contains a significant portion of the recovery fluid; and
a hydrothermal reforming facility operable to reform the heavy fraction stream into a reformed heavy fraction by contacting the heavy fraction stream with a water feed stream under supercritical conditions, wherein the reformed heavy fraction has reduced amounts of heavy fraction, asphaltene, sulfur, nitrogen or metal containing substances as compared to the whole crude oil.

17. The apparatus of claim 16, wherein the hydrothermal reforming facility comprises:
a mixing zone operable to receive the heavy fraction with the water feed at a slightly elevated temperature to create a heavy oil/water mixture;
a pre-heating zone that is fluidly connected with the mixing zone, the pre-heating zone operable to heat the heavy oil/water mixture to a temperature up to about 350° C.;
a high pressure pumping means, the high pressure pumping means operable to increase pressure of the heavy oil/water mixture to at least the critical pressure of water; and
a reaction zone that is fluidly connected with the pre-heating zone; the reaction zone comprising an interior portion of a main reactor, the main reactor being operable to withstand a temperature that is at least as high as the critical temperature of water; the main reactor being operable to withstand pressure in excess of the critical pressure of water, the reaction zone being essentially free of an externally-provided catalyst and essentially free of an externally-provided hydrogen source.

18. The apparatus of claim 17, wherein the mixing zone further comprises an ultra sonic wave generator that is operable to subject the heavy oil/water mixture to cavitations and further induce mixing of the heavy oil/water mixture by creating a submicromulsion.

19. The apparatus of claim 17, further comprising:
a pressure regulating device;
a liquid-gas separator fluidly connected to the pressure regulating device, the liquid-gas separator operable to create a liquid stream and a gas stream; and
a water-oil separator fluidly connected to the liquid-gas separator via the liquid stream, the water-oil separator operable to create a recovered water stream and an upgraded hydrocarbon stream.

20. The apparatus of claim 19, wherein the recovered water stream can be recycled and combined with the water feed, and the apparatus further comprising an oxidation reactor fluidly connected with the recovered water stream, the oxidation reactor operable to clean the recovered water stream via oxidation.

* * * * *